(12) United States Patent
Shi et al.

(10) Patent No.: US 11,453,086 B2
(45) Date of Patent: Sep. 27, 2022

(54) METHOD FOR LASER CLADDING AND FORMING OF METAL OR ALLOY UNDER PARTIAL ATMOSPHERE PROTECTION

(71) Applicant: Soochow University, Suzhou (CN)

(72) Inventors: Tuo Shi, Jiangsu (CN); Geyan Fu, Jiangsu (CN); Shihong Shi, Jiangsu (CN); Jizhuo Wu, Jiangsu (CN)

(73) Assignee: SOOCHOW UNIVERSITY, Suzhou (CN)

( * ) Notice: Subject to any disclaimer, the term of this patent is extended or adjusted under 35 U.S.C. 154(b) by 247 days.

(21) Appl. No.: 16/623,549

(22) PCT Filed: Mar. 12, 2018

(86) PCT No.: PCT/CN2018/078735
§ 371 (c)(1),
(2) Date: Dec. 17, 2019

(87) PCT Pub. No.: WO2019/001008
PCT Pub. Date: Jan. 3, 2019

(65) Prior Publication Data
US 2021/0016393 A1 Jan. 21, 2021

(30) Foreign Application Priority Data
Jun. 28, 2017 (CN) .......................... 201710504168.X

(51) Int. Cl.
*B23K 26/34* (2014.01)
*C23C 24/10* (2006.01)

(52) U.S. Cl.
CPC ............ *B23K 26/34* (2013.01); *C23C 24/106* (2013.01)

(58) Field of Classification Search
CPC .. B22F 2999/00; B22F 10/20; B22F 2998/10; B22F 12/00; B22F 2998/00;
(Continued)

(56) References Cited

U.S. PATENT DOCUMENTS

| 5,418,350 A * | 5/1995 | Freneaux | B23K 26/144 |
| | | | 219/121.84 |
| 2009/0314136 A1* | 12/2009 | Culf | B23K 35/327 |
| | | | 219/121.17 |

(Continued)

FOREIGN PATENT DOCUMENTS

| CN | 202380090 | 8/2012 |
| CN | 102864452 | 1/2013 |

(Continued)

OTHER PUBLICATIONS

English translation of CN-102864451-B (Year: 2014).*
(Continued)

*Primary Examiner* — Chris Q Liu
(74) *Attorney, Agent, or Firm* — Wenderoth, Lind & Ponack, L.L.P.

(57) ABSTRACT

The present invention relates to a method for laser cladding and forming of a metal or alloy under partial atmosphere protection. Including: transporting a metal or alloy powder beam by an inert carrier gas to move on a machined surface with a focused laser beam; and forming at least one layer of inert protective gas at the outer periphery of the metal or alloy powder beam. The inert protective gas includes first inert protective gas, and the first inert protective gas is at the outer periphery of the focused laser beam. The problems of limited size, high cost and difficulty in moving a cladding and forming system and the like during part forming are solved by forming the inert protective gas at the outer periphery of the focused laser beam. Compared with the prior art, the convenient, fast and economical method is provided for on-site part forming and repair.

3 Claims, 5 Drawing Sheets

(58) Field of Classification Search
CPC ........ B22F 1/0096; B22F 10/10; B22F 9/082;
B22F 1/0059; B22F 3/003; B22F 3/1035;
B22F 3/15; B22F 5/009; B22F 9/04;
B22F 10/00; B22F 1/0085; B22F
2009/047; B22F 2201/20; B22F 10/30;
B22F 1/0018; B22F 5/04; B22F 9/06;
B23K 26/144; B23K 26/34; B23K 26/32;
B23K 26/342; B23K 26/123; B23K
26/1476; B23K 26/03; B23K 26/032;
B23K 26/034; B23K 26/147; B23K
26/703; B23K 26/0006; B23K 26/10;
B23K 26/14; B23K 26/1464; B23K
26/1482
USPC .......... 219/121.64, 121.84, 121.63, 74, 136,
219/76.12, 121.17, 121.65, 121.66,
219/121.85, 73.21, 121.6, 121.77, 121.82,
219/137.41, 69.17, 75, 76.1, 76.16
See application file for complete search history.

(56) References Cited

U.S. PATENT DOCUMENTS

| 2010/0276396 A1* | 11/2010 | Cooper | B23K 35/38 |
| | | | 219/74 |
| 2012/0199564 A1* | 8/2012 | Washko, Jr | B23K 26/144 |
| | | | 219/121.63 |
| 2016/0175929 A1* | 6/2016 | Colin | B22F 10/25 |
| | | | 419/23 |
| 2016/0175983 A1* | 6/2016 | Chivers | B23K 26/0093 |
| | | | 219/76.1 |
| 2018/0326525 A1* | 11/2018 | Ann | B41F 19/005 |

FOREIGN PATENT DOCUMENTS

| CN | 102864451 B | * | 5/2014 |
| CN | 103952696 | | 7/2014 |
| CN | 203741418 | | 7/2014 |
| CN | 104384706 | | 3/2015 |
| CN | 104439707 | | 3/2015 |
| CN | 205856607 | | 1/2017 |
| CN | 107130239 | | 9/2017 |
| MY | 150484 | | 1/2014 |
| TW | 200607596 | | 3/2006 |

OTHER PUBLICATIONS

Mary Bagley, "Properties of Matter: Gases", Jan. 7, 2016 (Year: 2016).*

International Search Report dated Jun. 11, 2018 in International (PCT) Application No. PCT/CN2018/078735.

Yifan et al., "Study on Microstructure and Process of Titanium Alloy Formed by Inside-laser Coaxial Powder Feeding Technology", Applied Laser, vol. 37, No. 1, Feb. 28, 2017, pp. 38-14, with English Abstract.

* cited by examiner

METHOD FOR LASER CLADDING AND FORMING OF METAL OR ALLOY UNDER PARTIAL ATMOSPHERE PROTECTION

The present application claims priority to Chinese Patent Application No. CN201710504168X, filed on Jun. 28, 2017, and entitled "METHOD FOR LASER CLADDING AND FORMING OF METAL OR ALLOY UNDER PARTIAL ATMOSPHERE PROTECTION", which is incorporated herein by reference in its entirety.

TECHNICAL FIELD

The present invention relates to a method for laser cladding and forming of a metal or alloy under partial atmosphere protection.

BACKGROUND

Laser cladding forming is a micro-metallurgical stacking forming process based on the principle of "discrete-stacking". The laser cladding forming has been widely used because of its characteristics such as fast cooling rate, small deformation and excellent performance of a cladding layer. A titanium alloy has the characteristics of low density, high specific strength, high relative height, good corrosion resistance, and the like, and is widely used in the fields of aerospace chemical engineering, medical treatment and sports equipment and the like. However, surface cladding and forming of the titanium alloy has special requirements. Because metal titanium has high combining power with hydrogen, oxygen, nitrogen and carbon in the air, the complexity in smelting and processing of titanium and the titanium alloy is caused. Processes such as smelting and sintering of the titanium and the titanium alloy are required to be carried out in a highly vacuum or a purified inert atmosphere (such as argon and helium). As described in Chinese Patent Application No. CN104439707A, Chinese Patent Application No. CN104384706A, and Malaysia Patent Application No. MY150484A, at present, the laser cladding and forming of titanium alloys at home and abroad needs to be carried out in a special inert atmosphere chamber which is filled with a purified inert atmosphere. In addition, metals such as magnesium and aluminum and alloys thereof easily react with components in the air during laser cladding and forming, and an inert atmosphere is required for environmental protection.

The protective inert atmosphere chamber can protect metal and alloy molten pools from oxidation in the solidification and cooling process, and is a processing protection method currently widely used in laser forming and welding of metals and alloys. However, this forming method has some limitations: (1) the cost in establishing the atmosphere chamber and maintaining an atmosphere concentration is high; (2) the size of a formed part is limited by the size of the atmosphere chamber, so that it is impossible to form and clad large or super large-sized components; and (3) since it is difficult is move the atmosphere chamber, this leads to such a limitation to an entire laser forming system that the laser forming system cannot be moved for on-site repair at a site where parts are damaged.

SUMMARY

An objective of the present invention is to provide a method for laser cladding and forming of a metal or alloy under partial atmosphere protection. The method is convenient, fast and economical.

To achieve the above purpose, the present invention provides the following technical solution: A method for laser cladding and forming of a metal or alloy under partial atmosphere protection includes:

transporting a metal or alloy powder beam by an inert carrier gas to move on a machined surface with a focused laser beam; and forming at least one layer of inert protective gas at the outer periphery of the metal or alloy powder beam.

Further, the metal or alloy powder beam and the inert carrier gas are coaxial with the focused laser beam, and spraying directions thereof are consistent.

Further, the thickness of the inert protective gas of each layer is sequentially increased in the radial direction of a center line of the metal or alloy powder beam.

Further, the inert protective gas includes first inert protective gas, and the first inert protective gas is at the outer periphery of the focused laser beam.

Further, the first inert protective gas has a cone shape or an inverted cone shape or a cylindrical shape.

Further, the thickness of the first inert protective gas is 1 mm or more.

Further, the method is used in a cladding process, and a flow rate and cladding process parameter matching model of the first inert protective gas is as follows:

thickness of the inert protective gas: 1-30 mm;
laser power: 300-1500 w;
scanning speed: 3-20 mm/s;
powder feeding speed: 8-32 g/min;
flow rate of the first inert protective gas: 2-10 $L \cdot min^{-1}$; and
pressure of the inert protective gas: 0.02-0.08 MP.

Further, the inert protective gas also includes second inert protective gas, and the second inert protective gas is formed between the focused laser beam and the metal or alloy powder beam.

Further, the second inert protective gas has a cylindrical shape or an elliptical cylindrical shape or a convergent cone shape or a divergent cone shape.

Further, the inert protective gas includes one or more of helium, argon, neon, krypton, and xenon.

The present invention has the beneficial effects: the problems of limited size, high cost and difficulty in moving a cladding and forming system and the like during part forming are solved by forming an inert protective gas at the outer periphery of a focused laser beam, and compared with the prior art, the convenient, fast and economical method is provided for on-site part forming and repair.

The above description is only an overview of the technical solutions of the present invention. In order that the technical means of the present invention can be more clearly understood and implemented in accordance with the contents of the specification, the preferred embodiments of the present invention will be described in detail below with reference to the accompanying drawings.

DETAILED DESCRIPTION

The specific embodiments of the present invention will be further described in detail with reference to the accompanying drawings and embodiments. The following embodiments are intended to illustrate the present invention, rather than limiting the scope of the present invention.

A method for laser cladding and forming of a metal or alloy under partial atmosphere protection according to the present invention is used in a cladding process, and is mainly used for protecting materials which easily react with air, such as titanium, magnesium, aluminum and alloys thereof. The method essentially adopts a partial atmosphere chamber to form titanium or titanium alloy by means of laser. The method for laser cladding and forming of a metal or alloy under partial atmosphere protection is as follows: transporting a metal or alloy powder beam by an inert carrier gas to move on a machined surface with a focused laser beam; and forming at least one layer of inert protective gas at the outer periphery of the metal or alloy powder beam. The inert protective gas is disposed at the outer periphery of the metal or alloy powder beam so that the inert protective gas and inert carrier gas can prevent oxygen and nitrogen in the air from reacting with a metal or alloy in the processing process by forming a partial inert atmosphere environment. The metal or alloy powder beam and the inert carrier gas are coaxial with the focused laser beam, and spraying directions thereof are consistent. Since the inert protective gas, the metal or alloy powder beam and the inert carrier gas are coaxial and the spraying direction is consistent, two or more layers of inert gas do not interference with each other easily, so that on the one hand, the alloy powder beam is not blown off, and on the other hand, a formed partial inert gas laminar flow gas curtain is favorable for preventing external gas from entering and improving the concentration of the partial inert atmosphere. When the inert protective gas has at least two layers, the thickness of the inert protective gas of each layer is sequentially increased in the radial direction of a center line of the metal or alloy powder beam.

Figure 1:
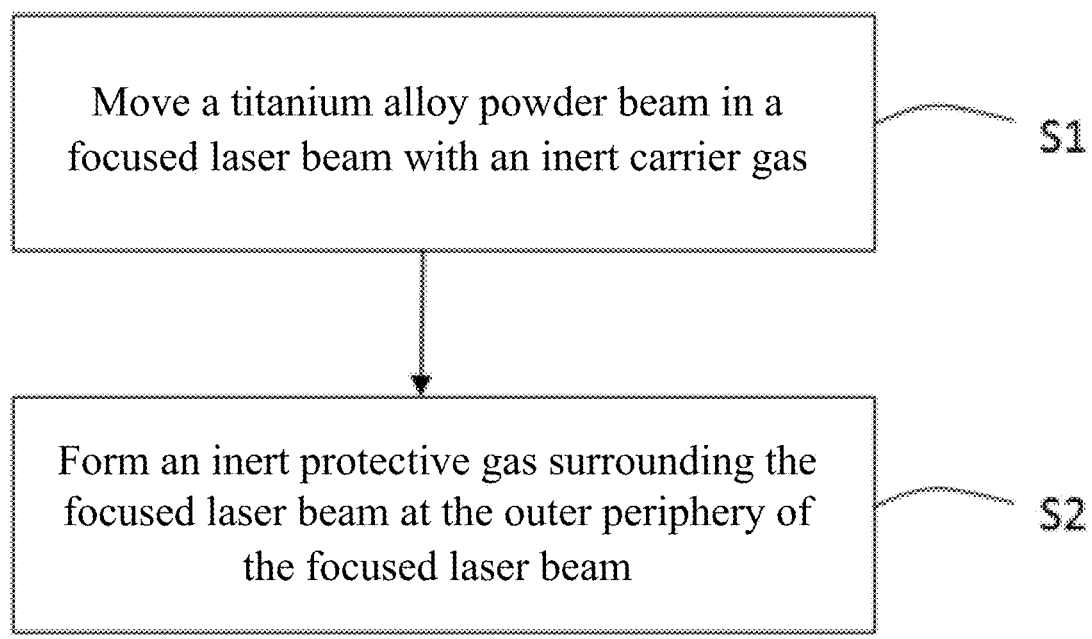
FIG. 1 is a flow chart of a method for laser cladding and forming of a metal or alloy under partial atmosphere protection shown in an embodiment of the present invention.
Figure 2:
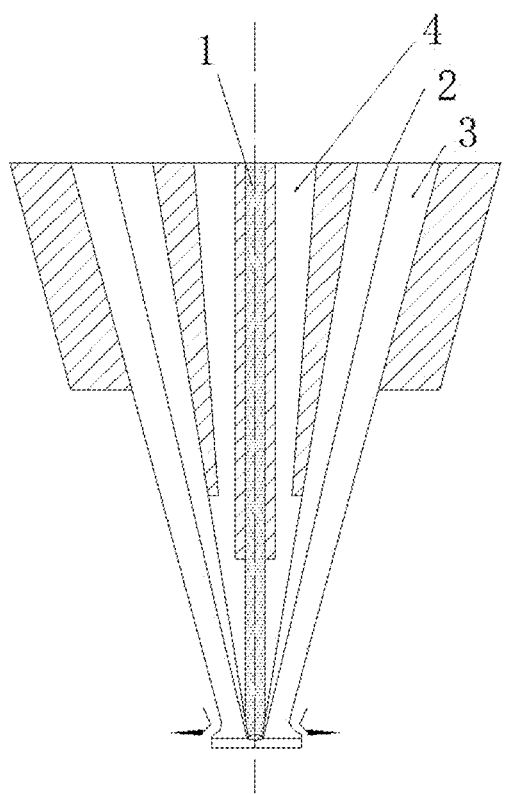
FIG. 2 is a schematic view of intra-laser coaxial powder feeding by a spray head according to the method shown in FIG. 1.

Referring to FIG. 1 and FIG. 2 together, in this embodiment, with a titanium alloy as an example, the method for laser cladding and forming of a metal or alloy under partial atmosphere protection is as follows:

Step S1: move a titanium alloy powder beam in a focused laser beam 2 with an inert carrier gas (a reference numeral 1 in FIG. 1 indicates a mixed material of inert carrier gas carrying a titanium alloy powder beam).

Step S2: form an inert protective gas surrounding the focused laser beam 2 at the outer periphery of the focused laser beam 2.

A mode of arrangement of the titanium alloy powder beam and the focused laser beam 2 is that the focused laser beam 2 is hollow and the titanium alloy powder beam is centered. In the cladding process, a single powder tube is located in the hollow annular focused laser beam 2, and inert carrier gas 1 carries the titanium alloy powder to send out the titanium alloy powder. The focused laser beam 2 is formed in such a manner: a laser beam is split, expanded, and focused to form the focused laser beam 2. The focused laser beam 2 is a cone-shaped beam.

In this embodiment, the inert protective gas includes first inert protective gas 3 and second inert protective gas 4; the metal or alloy powder beam, the first inert protective gas 3, the second inert protective gas 4 and the focused laser beam 2 are coaxial, and the spraying direction is consistent. The first inert protective gas 3 is at the outer periphery of the focused laser beam 2, and the second inert protective gas 4 is formed between the focused laser beam 2 and the metal or alloy powder beam. The inert protective gas includes one or more of helium (He), argon (Ar), neon (Ne), krypton (Kr), and xenon (Xe).

In this embodiment, the first inert protective gas 3 is in a cone shape and closely surrounds the outer side of the titanium alloy powder beam, and the first inert protective gas 3 has a certain thickness, specifically: the thickness of the first inert protective gas 3 is generally 1 mm or more. In order to ensure that a titanium alloy metallurgical melting channel is formed and after the partial first inert protective gas 3 is moved away, the temperature of a molten pool has dropped below the oxidation temperature of the titanium alloy to ensure that the molten pool is not oxidized during the solidification process, it is required to match process parameters of the first inert protective gas 3 such as flow rate, laser scanning speed, titanium alloy powder feeding amount and laser power. A flow rate and cladding process parameter matching model of the first inert protective gas 3 is as follows: gas curtain size (thickness) of the first inert protective gas 3: 1-30 mm; laser power: 300-1500 w; scanning speed: 3-20 mm/s; powder feeding speed: 8-32 g/min; flow rate of the first inert protective gas 3: 2-10 $L \cdot min^{-1}$; and pressure of the first inert protective gas 3: 0.02-0.08 MP. In other embodiments, the first protective gas 3 may also have an inverted cone shape or a cylindrical shape. In this embodiment, the first inert protective gas 3 is in a cone shape to achieve the objective of fitting the focused laser beam 2 to further prevent oxidation of the titanium alloy during cladding and forming.

In this embodiment, the second inert protective gas 4 is provided so that on the one hand, the titanium alloy powder beam sent out can be collimated, and on the other hand, the gas concentration of the partial inert atmosphere environment can be enhanced. The second inert protective gas has a cylindrical shape. Certainly, in other embodiments, the second inert protective gas may also have an elliptical cylindrical shape or a convergent cone shape or a divergent cone shape. The thickness of the second inert protective gas is smaller than that of the first inert protective gas.

In order to more clearly illustrate the effect of the present invention, the above method is used to form a straight wall, and parameters of the flow rate and cladding process parameter matching model of the first inert protective gas 3 are as follows:

| | Laser power P (W) | Scanning speed (mm/min) | Speed of a powder feeding turntable Vr ($r \cdot min^{-1}$) | Powder loading air pressure Pr (bar) | Powder loading airflow quantity Q ($L \cdot min^{-1}$) | Pressure p (Mp) |
|---|---|---|---|---|---|---|
| 1 | 1000 | 6 | 2 | 3 | 3 | 0.02 |
| 2 | 1000 | 6 | 2 | 3 | 2 | 0.04 |

Figure 3:
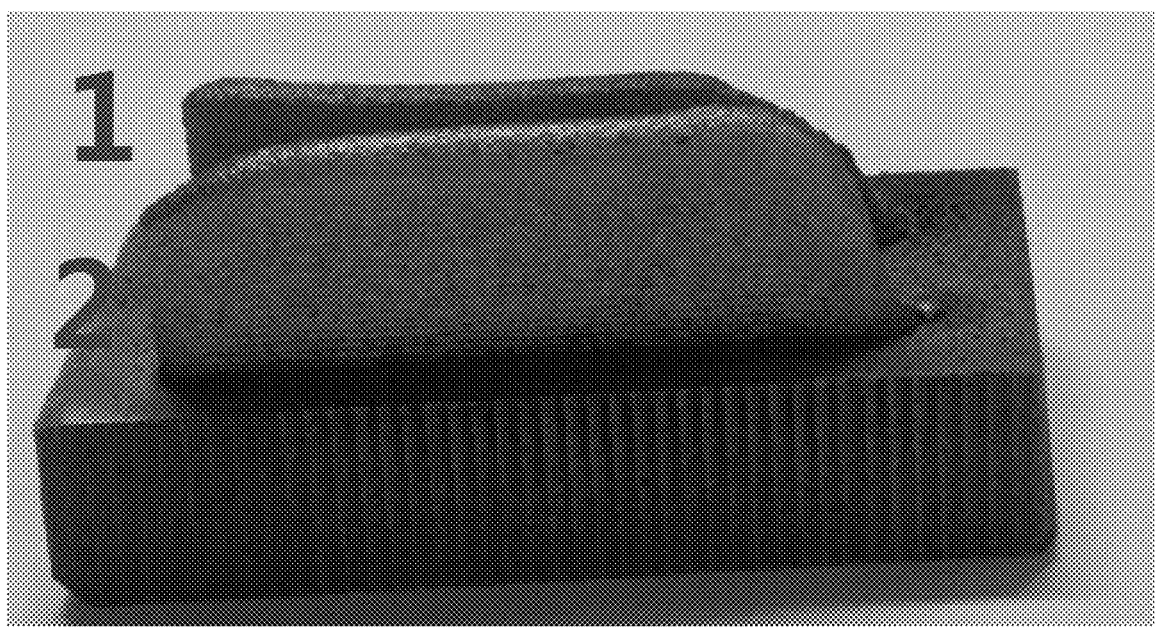
FIG. 3 is an experimental photograph after the use of the method shown in FIG. 1.
Figure 4A:
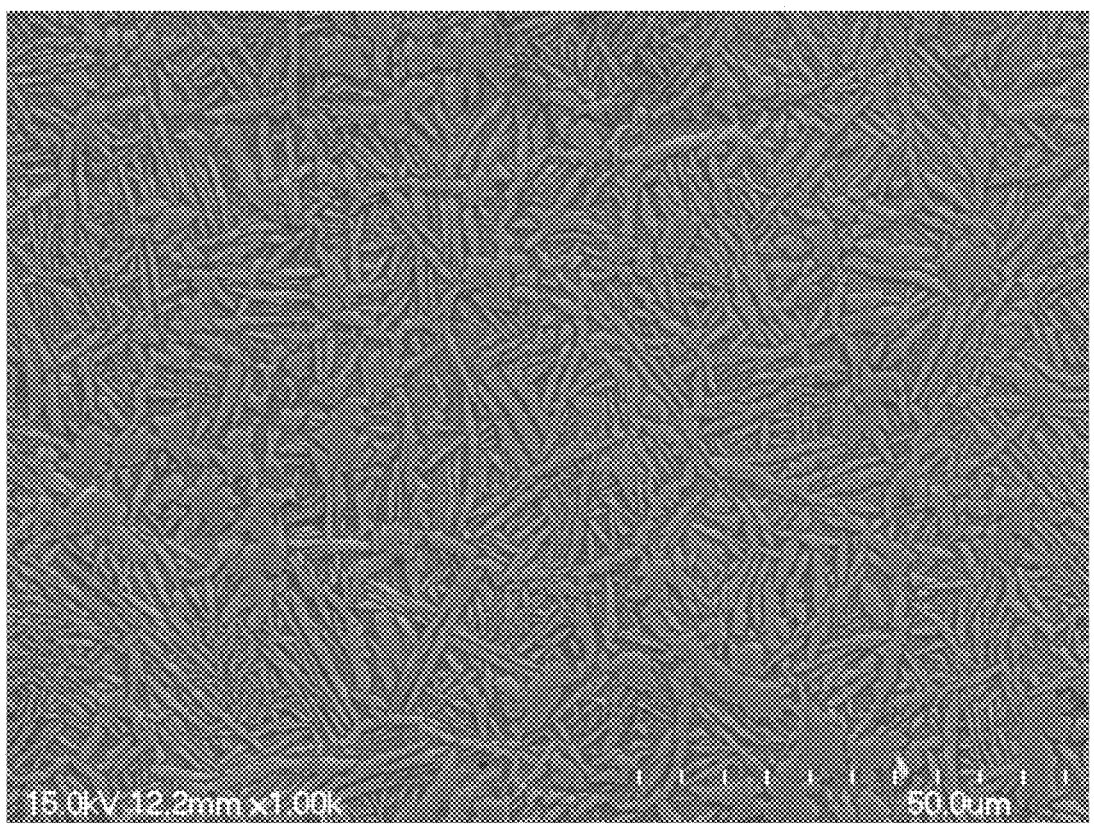
FIG. 4a is an SEM photograph of a middle portion structure of a straight wall of a formed part in FIG. 3.
Figure 4B:
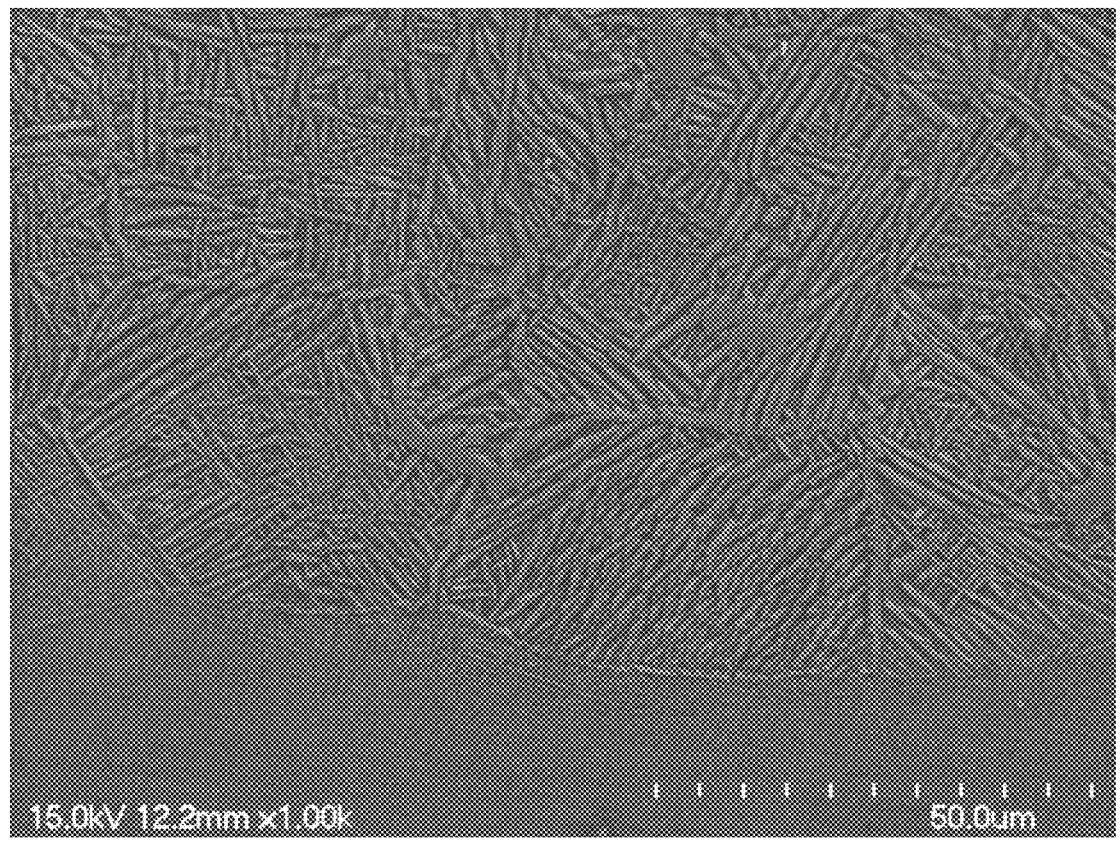
FIG. 4b is an SEM photograph of a junction of a first cladding layer and a substrate of the formed part in FIG. 3.
Figure 4C:
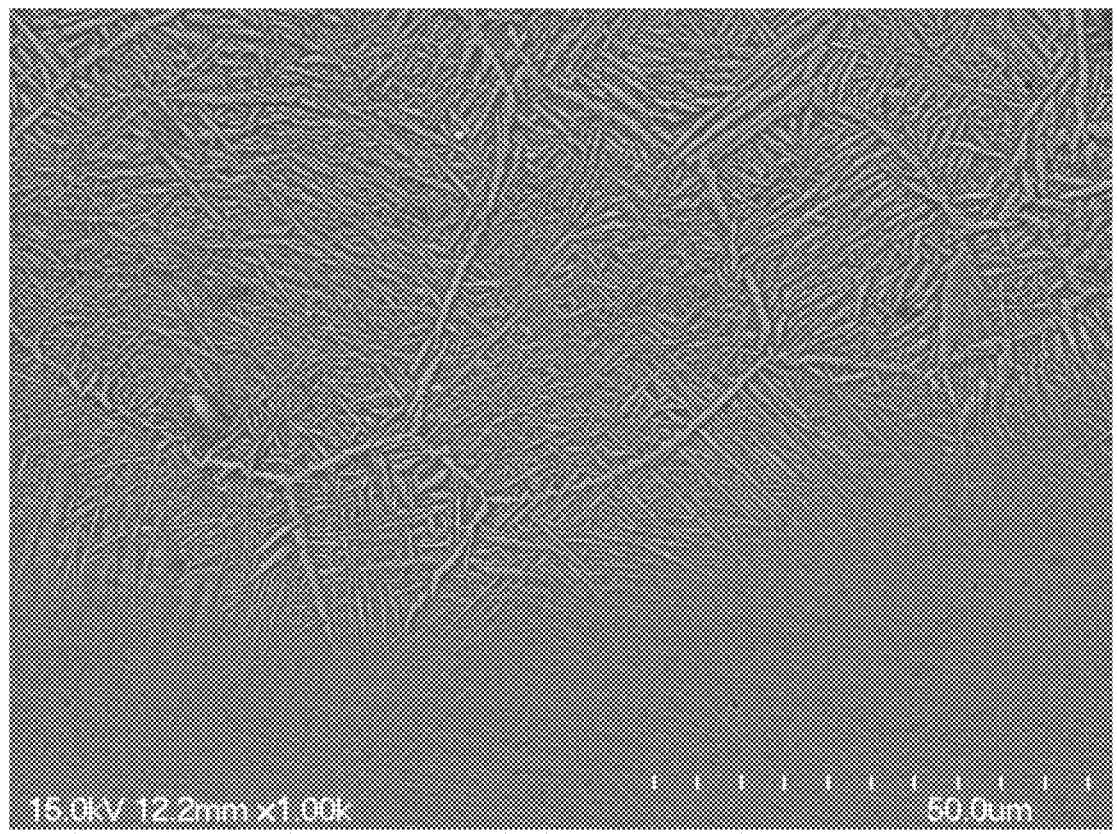
FIG. 4c is an SEM photograph of a junction of a second cladding layer and a substrate of the formed part in FIG. 3.

An experimental photograph obtained by the above method is shown in FIG. 3. In FIG. 3, the straight wall of one side of the reference numeral 1 is a first part, and the straight wall of one side of a reference numeral 2 is a second part. The above experimental photograph was observed under a microscope (see FIGS. 4*a* to 4*c*). It can be known through the SEM photograph that a cladding layer is dense in structure and has no pores and cracks; and a junction of the cladding layer and a matrix is better.

In summary, according to the method for laser cladding and forming of a metal or alloy under partial atmosphere protection: the problems of limited size, high cost and difficulty in moving a cladding and forming system and the like during part forming are solved by forming an inert protective gas at the outer periphery of the focused laser beam 2, and compared with the prior art, the convenient, fast and economical method is provided for on-site part forming and repair.

The technical features of the above embodiments may be arbitrarily combined. For brevity of description, all possible combinations of the technical features in the above embodiments are not described. However, as long as there is no contradiction between the combinations of these technical features, all these combinations should be considered as the scope of this specification.

The above embodiments are merely illustrative of several implementation manners of the present invention, and the description thereof is more specific and detailed, but is not to be construed as a limitation to the patentable scope of the present invention. It should be pointed out that several variations and improvements can be made by those of ordinary skill in the art without departing from the conception of the present invention, but such variations and improvements should fall within the protection scope of the present invention. Therefore, the protection scope of the patent of the present invention should be subject to the appended claims.

What is claimed is:

1. A method for laser cladding and forming of a metal or alloy under partial atmosphere protection, comprising:
    providing a metal or alloy powder beam by an inert carrier gas and a focused laser beam;
    moving the metal or alloy powder beam with the inert carrier gas and the focused laser beam on a machined surface; and
    forming at least two layers of inert protective gas laminar flow gas curtain at an outer periphery of the metal or alloy powder beam to isolate external gas,
    wherein the metal or alloy powder beam and the inert carrier gas are coaxial with the focused laser beam, and spraying directions thereof are consistent; and
    wherein the method is performed by using a coaxial spray head, which comprises
        a metal or alloy powder beam passage arranged axially at a center of the coaxial spray head, for transporting the metal or alloy powder beam;
        laser beam passages arranged symmetrically at an outer periphery of the metal or alloy powder beam passage, for transporting the focused laser beam;
        first inert protective gas passages arranged symmetrically at an outer periphery of the laser beam passages, for transporting a first layer of the at least two layers of inert protective gas laminar flow gas curtain; and
        second inert protective gas passages arranged symmetrically between the metal or alloy powder beam passage and the laser beam passages, for transporting a second layer of the at least two layers of inert protective gas laminar flow gas curtain.

2. The method for laser cladding and forming of the metal or alloy under partial atmosphere protection according to claim 1, wherein the method is used in a cladding process, and a flow rate and cladding process parameter matching model of the first inert protective gas is as follows:
    laser power: 300-1500 w;
    scanning speed: 3-20 mm/s;
    powder feeding speed: 8-32 g/min;
    flow rate of the first inert protective gas: 2-10 $L \cdot min^{-1}$; and
    pressure of the inert protective gas: 0.02-0.08 MP.

3. The method for laser cladding and forming of the metal or alloy under partial atmosphere protection according to claim 1, wherein the inert protective gas comprises one or more of helium, argon, neon, krypton, and xenon.

* * * * *